Aug. 28, 1956   H. A. TOULMIN, JR   2,760,881
TILE AND METHOD OF MAKING
Filed Dec. 4, 1953
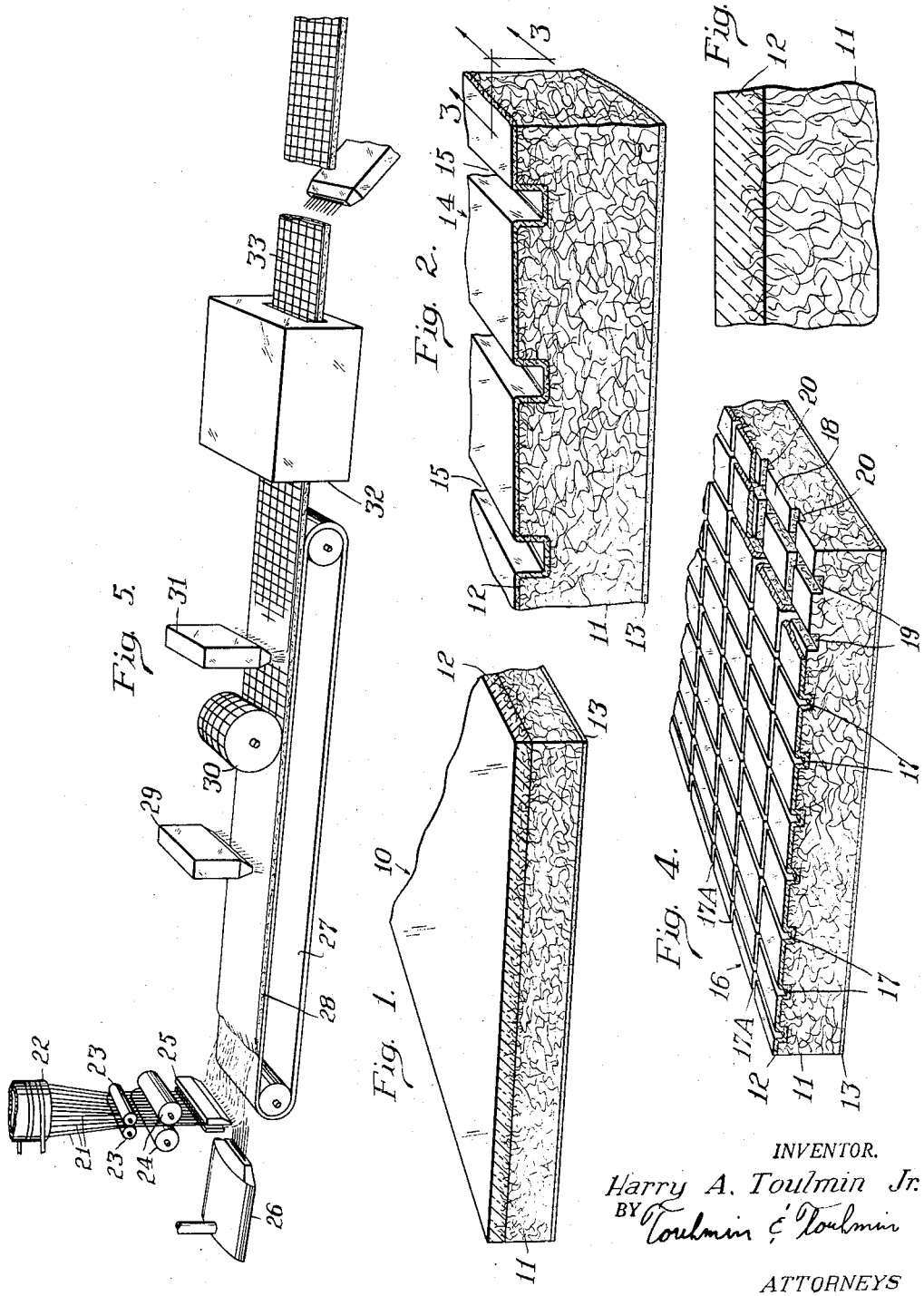
INVENTOR.
Harry A. Toulmin Jr.
BY Toulmin & Toulmin
ATTORNEYS United States Patent Office 2,760,881
Patented Aug. 28, 1956

2,760,881

TILE AND METHOD OF MAKING

Harry A. Toulmin, Jr., Dayton, Ohio, assignor to The Commonwealth Engineering Company of Ohio, Dayton, Ohio, a corporation of Ohio Application December 4, 1953, Serial No. 396,156

10 Claims. (Cl. 117—9)

This invention relates to tile members, more particularly to a ceramic building unit especially adapted for use as a floor covering, and the method of making same.

In the past the use of ceramic tile as a building unit has been limited due to the fact that such tile members are fragile, expensive, and non-resilient. In addition, any ceramic tile members which were used were manufactured in rather small units, which necessitated the use of highly skilled workers in order to assemble these tiles into a surface. Ceramic tiles have found a very limited use as floor coverings because of the fact that they are non-resilient. Those persons having occasion to be on their feet for any length of time on such a floor tend to become easily fatigued. Ceramic tiles of any sort are fragile and must be handled with great care both in manufacture and when assembled in construction. Furthermore, a serious problem is encountered in securing a satisfactory grouting with ceramic tiles as the grouting tends to crack with age. Because of these factors ceramic tiles have not been extensively used in building.

This invention provides a ceramic tile in which all of the disadvantages listed above have been eliminated. Furthermore, this invention provides a process whereby this ceramic tile may be quickly and easily manufactured in a continuous sheet.

The tile disclosed in this invention comprises a glass fiber sheet having a ceramic coating on the upper surface thereof, and a suitable adhesive backing on the under surface thereof. The ceramic surface of the tile may contain a pattern of grooves if so desired. The adhesive layer on the under surface of the tile member is optional, but is preferable if the tile member is to be used as wall or ceiling covering.

As the main constituent of the ceramic tile member of this invention is a glass fiber panel, it can be seen that this tile member has certain resilient qualities lacking in the conventional ceramic tile. In addition, as the glass fiber panel serves as a substitute for a considerable quantity of ceramic material, the resulting tile member is much lighter in weight than conventional ceramic tile.

This invention also discloses a method whereby the ceramic tile member of this invention may be produced in a continuous sheet. This sheet may then be divided in ceramic tile members of any desired length, and it is thus possible easily and quickly to attach the ceramic tile members either as a floor or wall covering. As the time and effort required to place the ceramic tile members is considerably reduced, the cost of installing tiles is made much more reasonable. The method of making the ceramic tile member of this invention comprises essentially the steps of positioning glass fibers in a continuous sheet on a moving belt, injecting a resin into the glass fibers, applying a ceramic tile material to the upper surface of the sheet, passing the entire sheet through an oven to bake the ceramic material, and, finally, dividing the continuous sheet of ceramic tile into desired lengths. If it is desired, a pattern of grooves may be pressed into the glass fiber sheet immediately after the resin is injected into the glass fibers. As a result, the ceramic tile member will have a grooved pattern thereon. Also, if desired, an adhesive backing may be added to the ceramic tile member. It is preferable that this step take place after the ceramic tile member emerges from the oven.

It is an object of this invention to provide an improved ceramic tile member.

It is another object of this invention to provide a ceramic tile member having a glass fiber panel as its principal constituent.

It is a further object of this invention to provide a ceramic tile covering which is light in weight and resilient so as to be readily adapted for use as a floor covering.

It is an additional object of this invention to provide a light-weight, resilient ceramic tile member having an adhesive backing in order to facilitate the attachment of the tile member to the surface desired to be covered.

It is still another object of this invention to provide an inexpensive process for the manufacture of ceramic tile members.

It is a still further object of this invention to provide a process in which a light-weight ceramic tile member may be easily made.

Another object of this invention is to provide a process for the making of a resilient, light-weight ceramic tile member in a continuous sheet.

Other objects and advantages of this invention will become readily apparent in view of the following description taken in conjunction with the accompanying drawings in which:

Figure 1 is a perspective view of a portion of the ceramic tile member of this invention, showing the various components thereof;

Figure 2 is a perspective view of a portion of the ceramic tile member of this invention wherein the ceramic surface has grooves therein;

Figure 3 is a partial sectional view taken along the lines 3—3 in Figure 2, and discloses the manner in which the ceramic layer interlocks with the glass fibers on the top surface of the glass fiber panel;

Figure 4 is a perspective view of the tile member of this invention having a pattern of grooves in the ceramic surface thereof, and having a portion of the ceramic surface cut away in order to show the grooves in the glass fiber panel before the ceramic is applied thereto; and Figure 5 is a diagrammatic view showing the apparatus by which the ceramic tile member of this invention may be manufactured in a continuous sheet.

Returning now to the drawings, more particularly to Figure 1, wherein like reference characters indicate the same parts throughout the various views, 10 indicates generally a ceramic tile member constructed in accordance with this invention. The ceramic tile member 10 comprises a glass fiber panel 11. The glass fiber panel 11 is preferably made by injecting a suitable binding agent into a sheet of glass fibers in order to form a relatively rigid panel member. It is to be understood that other methods may be used in constructing the glass fiber panel 11. By way of example any suitable natural or synthetic resin may be used as a binding agent.

A ceramic layer 12 is applied to one face of the glass fiber panel 11. This ceramic layer may be made of the usual ceramic constituents of such tiles as, for example, a mixture of shales, clays, or clay with or without coloring oxides.

An adhesive coating 13 may be applied to the other face of the glass fiber panel member 11. This adhesive coating is optional, but should be applied if it is desired to use panel member 10 as a wall or ceiling covering.

Turning now to Figure 2 there is shown a ceramic tile member 14 in which the ceramic layer 12 has grooves 15. The ceramic tile member 14 also comprises a glass fiber panel member 11 and the optional adhesive coating 13.

Figure 3 discloses the manner in which it is desired to secure the ceramic layer 12 to the glass fiber panel 11. It can be seen in Figure 3 that individual glass fibers are interlocked with the ceramic layer 12. This effect may be accomplished by applying unbaked ceramic material to the glass fiber panel member 11 under pressure to cause some of the ceramic material to infiltrate the panel 11 and to cause several of the glass fibers of the panel 11 to become intermixed with particles of the unbaked ceramic material constituting the ceramic layer 12. By virtue of this construction a substantial bond is obtained between the glass fiber panel 11 and the ceramic layer 12 which serves to reinforce the ceramic layer 12.

Figure 4 discloses a panel member 16 which is the embodiment of this invention containing a grooved pattern on the ceramic surface. The ceramic tile member 16 comprises a glass fiber panel 11, an optional adhesive backing 13, and a ceramic layer 12 which has a plurality of spaced longitudinal grooves 17 which are intersected by a plurality of spaced transverse grooves 17A. 18 indicates generally that portion of the glass fiber panel 11 from which some of the ceramic layer 12 has been cut away in order to show the configuration of the panel 11 before the ceramic is applied thereto. It will be seen that the glass fiber panel 11 consists of a plurality of spaced longitudinal grooves 19 intersected by a plurality of spaced transverse grooves 20. The method of making these grooves in glass fiber panel 11 will be described later.

The tile members illustrated in Figures 1 and 4 are manufactured by means of the same process. The apparatus for carrying out this process is diagrammatically illustrated in Figure 5. In order to clearly describe the process by which the ceramic tile member of this invention is manufactured, each step of the process will be described in detail as it occurs during an actual manufacturing operation. A plurality of glass fibers indicated at 21 is extruded from suitable apparatus indicated at 22. As the apparatus 22 is in the form of a circle, the glass fibers 21 are passed through rollers 23 and 24 in order to arrange the circle of fibers into a substantially flat sheet. After passing through the rollers 23 and 24 the fibers are further passed through an evening device 25. As the fibers emerge from the evening device 25 they are subjected to a jet of air from the air jet 26. This air jet places the fibers onto a moving belt 27 in the form of a continuous sheet 28. By adjusting the speed of the belt 27 the thickness of the continuous sheet 28 may be easily varied.

As the continuous sheet 28 is carried along by the moving belt 27, a binding agent is injected into the sheet 28 from the apparatus indicated at 29. As pointed out above this binding agent may be any suitable natural or synthetic resin. When the sheet 28 has been impregnated with resin a patterned roller 30 impresses the desired pattern of grooves into the glass fiber sheet 28. When the sheet 28 emerges from the roller 30 its appearance is as indicated at 18 in Figure 4. The grooved surface of the sheet 28 is then passed beneath a hopper 31 which contains a quantity of unbaked ceramic material. This ceramic material is preferably in a finely-ground powdered form. As the ceramic material is applied to the glass fiber sheet 28 a coating of this ceramic will adhere to the grooved surface of the glass fiber sheet. The presence of the resin in the glass fiber sheet 28 will cause the ceramic material to adhere to the walls and bottoms of the grooves.

The glass fiber sheet 28 is then passed through an oven indicated at 32 which bakes the ceramic material. As a result of this baking the ceramic material is solidified into a vitreous mass. The glass fiber sheet 28 emerges from the oven 32 as the finished ceramic tile member 33. If it is so desired an adhesive backing may be applied to the member 33 at this point. The adhesive backing may be any pressure-sensitive cement or mastic. If desired a mixture of powdered resin and whiting may be applied as an adhesive backing.

As a result of the process illustrated in Figure 5 it can be seen that the ceramic tile member 33 emerges as a continuous sheet which may be divided into desired lengths. As the entire process is automatic, this method of producing ceramic tile members is relatively inexpensive. Thus it can be seen that this invention discloses a ceramic tile member for use as covering for a wall, ceiling or floor. This ceramic tile member is light in weight, easy to handle, and may be attached in place with a minimum of difficulty. This invention also discloses an inexpensive and rapid process for manufacturing this ceramic tile member. As the glass fiber panel forms a cushion for the ceramic layer, this ceramic tile member may be used as a floor covering without resulting in undue fatigue to the persons moving about on such a floor. As this ceramic tile member may be made in virtually any length which is convenient to handle, it can be seen that a ceramic covering may be had merely by attaching a ceramic panel member in place by means of the adhesive backing.

It will be understood that this invention is susceptible to modification in order to adapt it to different usages and conditions, and, accordingly, it is desired to comprehend such modifications within this invention as may fall within the scope of the appending claims.

What is claimed as this invention is:

1. A tile member comprising a glass fiber panel, a ceramic tile layer on one side thereof, and an adhesive backing on the other side thereof.

2. A tile member comprising a glass fiber panel, the top of said panel impregnated with a ceramic layer, and the other side of said panel having an adhesive coating.

3. A tile member comprising a sheet of glass fibers, a grooved pattern on one side of said sheet, the grooved surface of said sheet being impregnated with a ceramic layer, and the other side of said sheet having an adhesive coating.

4. A tile floor member comprising a sheet of glass fibers, a binder to bind said glass fibers together, a grooved pattern on one side of said bound glass-fiber sheet, the grooved side of said glass-fiber sheet impregnated with a ceramic layer, and the other side of said sheet having an adhesive coating.

5. In a ceramic tile building member, the combination of a glass fiber sheet, a ceramic top layer thereon, and an adhesive backing on said sheet.

6. The method of making a ceramic tile member comprising positioning glass fibers in a continuous sheet, injecting a binder into the glass fibers, applying an unbaked ceramic tile material to the sheet, solidifying the ceramic tile material by baking, and applying an adhesive backing to the under surface of the sheet.

7. The method of making a ceramic tile member consisting of the steps of blowing glass fibers into a continuous sheet, impregnating the sheet with resin to bind the glass fibers together, pressing a pattern of grooves into the top surface of the sheet, applying an unbaked ceramic material under pressure to the grooved surface so as to cause the ceramic material to interlock with the glass fibers in the grooved surface of the sheet, passing the sheet through an oven to bake the ceramic material, and applying an adhesive backing to the underside of the sheet.

8. A tile member comprising a relatively rigid fibrous glass panel, said panel being resilient, there being a pattern of grooves on one face of said panel, a relatively thin ceramic tile coating impregnating said grooved panel face, said ceramic coating being interlocked with the topmost glass fibers of said panel to form a plurality of bonds with individual ones of said topmost glass fibers.

9. In a tile building unit, a combination of a fibrous glass panel having sufficient thickness so as to be relatively rigid but being resilient, and a ceramic tile coating impregnating one face of said panel to form a plurality of interlocking bonds with individual ones of the topmost glass fibers.

10. The method of making a ceramic tile member comprising the steps of positioning glass fibers in a continuous panel, injecting a binding agent into the glass fibers, making grooves in the top surface of the panel, applying a thin coating of unbaked fluid ceramic material under pressure to the grooved surface to cause intermixing of the unbaked ceramic particles with the glass fibers to form an interlocking bond between the ceramic layer and the glass fiber panel, and advancing the panel through an oven to bake the ceramic material into a solid layer.

References Cited in the file of this patent

UNITED STATES PATENTS

| | | |
|---|---|---|
| 1,999,371 | Parsons | Apr. 30, 1935 |
| 2,136,170 | Luertzing | Nov. 8, 1938 |
| 2,189,840 | Simison et al. | Feb. 13, 1940 |
| 2,297,337 | Wiley | Sept. 29, 1942 |
| 2,404,904 | Collins | July 30, 1946 |
| 2,444,347 | Greger et al. | June 29, 1948 |